July 31, 1928.

W. S. THOMSON 1,679,103

ELECTRICALLY DRIVEN CIRCULAR SAW

Filed March 9, 1927

Inventor
William S. Thomson
By Louis M. Schmidt
Atty.

Patented July 31, 1928.

1,679,103

UNITED STATES PATENT OFFICE.

WILLIAM S. THOMSON, OF PLANTSVILLE, CONNECTICUT, ASSIGNOR TO THE TOBRIN TOOL COMPANY, OF PLANTSVILLE, CONNECTICUT, A CORPORATION.

ELECTRICALLY-DRIVEN CIRCULAR SAW.

Application filed March 9, 1927. Serial No. 174,037.

My invention relates to improvements in electrically-driven circular saws, of the form that is adapted for a medium grade of work as to size or the like and adapted for the use of carpenter contractors and the like and that has means of adjustment for the depth of the cut and for cutting at an angle, and the object of my improvement is to produce an electrically-driven circular saw in which the table is generally fixed in a horizontal position, has convenient means for tilting at an angle to the plane of the saw, and in which the depth of the cut is regulated by means that are conveniently arranged to swing the saw and motor driving means as a body relatively to the table, and which, furthermore, is built-up of relatively few simple and substantially built parts.

In the accompanying drawing:—

Figure 1:
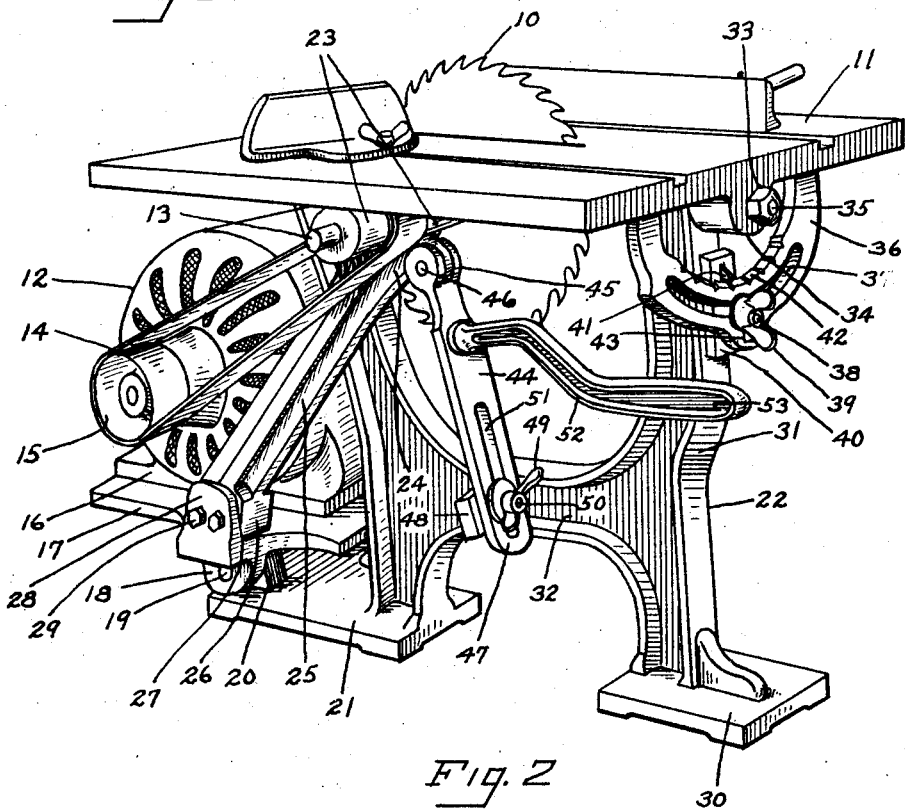
Figure 1 is a perspective view of my improved electrically-driven circular saw.
Figure 2:
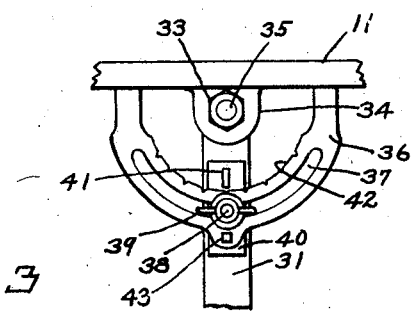
Figure 2 is a fragmentary view at the rear end showing the tilting adjustment means and adjacent parts for angular adjustment of the table.
Figure 3:
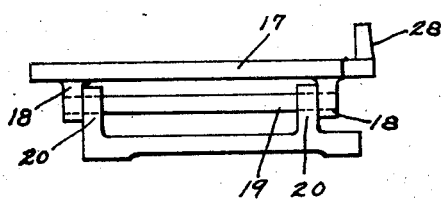
Figure 3 is a fragmentary view at the front end showing pivotal support for the motor bed and adjacent parts.

My improved electrically-driven circular saw comprises means for operatively supporting and driving the circular saw 10 that is projected through the slotted table 11.

Said saw 10 is supported independent of the table and is raised and lowered relatively thereto for varying the depth of the cut and this movement is provided for by means that serve to swing bodily the driving electric motor 12 and the parts that are intermediate the same and the saw.

Thus the saw 10 is mounted on the shaft 13 and on this is mounted a pulley that is driven by the belt 14 that connects with the motor pulley 15.

The motor 12 is located adjacent the front end of the structure and the bed thereof 16 is mounted on a swinging platform 17. The pivotal connection for the platform 17 is provided by means of dependent ears 18 that engage with a shaft 19. Bearings for said shaft 19 are provided by means of upstanding lugs 20 that are supported from the front foot structure 21 of the cast main frame 22.

The bearing 23 for the saw shaft 13 is supported from the upper free end 24 of an arm 25 that projects upwardly from the platform 17. As shown, the arm 25 is a separate casting that has its lower end 26 fitted within a corner 27 that is formed by the upper face of the platform 17 and an upstanding lug 28 and that is secured in place by means of the screws 29.

Thus the platform structure 17 serves as the support for the motor and the saw and the connecting parts, so that all can be swung back and forth as a unit.

The frame 22 comprises the front foot 21, already mentioned, the rear foot 30, and an integral upstanding structure for supporting the table and the locking means for the saw.

Said upstanding structure comprises generally similar front and rear arms 31 that are connected adjacent their lower portions by the cross-connecting bar 32.

The main connection between the arms or standards 31 and the table 11 comprises in each case a pivotal connection 33 that, as shown, is composed of a sleeve-like lug 34 on the under side of the table and a stud-like shaft 35 that is supported from the outer face of the standard 31. The pivotal connections 33 permit of tilting the table 11. For locking the table 11 in the adjusted position there is provided an arc-shaped bracket 36 that depends from the under side of the table 11, being secured thereto by its ends, and that has an arc-shaped slot 37 for the locking stud 38, the latter being provided with the locking wing-nut 39.

The stud 38 is carried by a block 40 that is mounted on the standard 31. Said block 40 also carries an index finger 41 that cooperates with the adjacent curved edge portion 42 of the bracket 36. Said curved edge portion 42 may be notched to indicate angular relation of the table and the frame or may carry a marked plate or the like.

To indicate zero adjustment of the table, corresponding to the horizontal position of the table a pin 43 is provided that cooperates with suitable openings in the bracket 36 and the frame.

To lock the saw relatively to the table a link 44 is provided and this inter-connects the arm 25 with the cross-bar 32.

The upper end 45 of the link 44 is pivotally connected to the upper free end 24 of the arm 25 by means of the pin 46. The lower end portion 47 of the link 44 is locked to a block 48 that projects from the cross-bar 32 by means of the wing-nut 49 and stud 50, the latter traveling in a slot 51 in the link 44.

The link 44 carries a handle 52 that projects generally rearwardly and is shaped by suitable bends for positioning the free end gripping portion 53 so as to be located for facilitating convenience in operating.

As mentioned, the platform structure 17 with its associated parts are arranged to swing as a unit, and these parts comprise the upstanding arm 25 that supports the bearing 23 for the saw shaft 13. Said swinging structure or unit operates as a lever of the third class; the pivot being located at the extreme lower end, at the bottom of the platform 17; the work being at the extreme upper end, involving the operation of the saw on the shaft 13; the handle 52 intermediate said ends being used to effect the swinging for the desired adjustment; and, finally, the locking mechanism being set to lock the parts after such adjustment, so that the supporting structure under conditions of use is rigid. The cutting is effected by sliding the work along the table.

The platform 17 and the motor are at the front end, away from the operator and the handle 52 is at the rear and readily accessible to the workman, as is also the locking mechanism.

I claim as my invention:—

An electrically-driven circular saw comprising a frame and a table supported thereby, a swinging structure arranged to operate relatively to said frame as a lever of the third class pivoted at one side of said frame and comprising a motor supporting platform at the lower pivoted end, a bearing for the saw shaft at the upper end to project the saw through the table at about the middle thereof, and a supporting adjusting arm pivoted to said lever intermediate said platform and shaft and adjustably engaging the frame, and a handle for manipulating said structure projecting from said arm to the other side of the table for manipulation from the operator's position.

WILLIAM S. THOMSON.